(12) United States Patent
Blickle et al.

(10) Patent No.: US 11,471,995 B2
(45) Date of Patent: Oct. 18, 2022

(54) OSCILLATING ELECTRIC POWER TOOL WITH BALANCED ARMATURE SHAFT

(71) Applicant: C. & E. Fein GmbH, Schwaebisch Gmuend-Bargau (DE)

(72) Inventors: Juergen Blickle, Goeppingen (DE); Achim Hess, Korb (DE); Olaf Klabunde, Glengen (DE)

(73) Assignee: C. & E. Fein, Schwaebisch Gmuend-Bargau (DE)

( * ) Notice: Subject to any disclaimer, the term of this patent is extended or adjusted under 35 U.S.C. 154(b) by 196 days.

(21) Appl. No.: 17/039,104

(22) Filed: Sep. 30, 2020

(65) Prior Publication Data

US 2021/0008683 A1 Jan. 14, 2021

Related U.S. Application Data

(60) Division of application No. 15/848,069, filed on Dec. 20, 2017, now Pat. No. 10,828,743, which is a
(Continued)

(30) Foreign Application Priority Data

Jun. 25, 2015 (DE) ...................... 10 2015 110 266.8

(51) Int. Cl.
*F16F 15/32* (2006.01)
*H02K 7/04* (2006.01)
(Continued)

(52) U.S. Cl.
CPC ............ *B24B 23/04* (2013.01); *B27B 19/006* (2013.01); *F16F 15/322* (2013.01); *H02K 7/04* (2013.01);
(Continued)

(58) Field of Classification Search
CPC ......... B24B 23/04; F16F 15/32; F16F 15/322; H02K 7/04; H02K 7/075; H02K 15/165; H02K 15/16
See application file for complete search history.

(56) References Cited

U.S. PATENT DOCUMENTS

| | | | |
|---|---|---|---|
| 4,286,675 A | 9/1981 | Tuggle | |
| 7,226,348 B1 | 6/2007 | Chang | |

(Continued)

FOREIGN PATENT DOCUMENTS

| | | |
|---|---|---|
| DE | 60 130 681 T2 | 7/2008 |
| EP | 0 660 491 A1 | 6/1995 |

(Continued)

OTHER PUBLICATIONS

Hines, Gordon E et al., "Establishing Balance Tolerances for Armatures", Sep. 30, 2021, Hines Industries, https://www.hinesindustries.com/resources/articles/131-establishing-balance-tolerances-for-armatures.*

(Continued)

*Primary Examiner* — Gloria R Weeks
(74) *Attorney, Agent, or Firm* — Muncy, Geissler, Olds & Lowe, P.C.

(57) ABSTRACT

An oscillating power tool with an electric motor is provided, including an armature shaft with an armature and a fan wheel, including an eccentric arranged on the armature shaft at one end thereof, a first balancing mass for balancing an unbalance of the eccentric and possibly an eccentric bearing, being arranged in the proximity of the eccentric or the eccentric bearing, respectively, however, at an axial distance, further including a second balancing mass for balancing a couple unbalance caused by the axial distance between the eccentric and the eccentric bearing, respectively, and the first balancing weight, wherein the second balancing mass is arranged on the armature shaft at the side
(Continued)

facing away from the eccentric or the eccentric bearing. Also a method for balancing such an electric motor is provided.

9 Claims, 3 Drawing Sheets

Related U.S. Application Data continuation of application No. PCT/EP2016/063597, filed on Jun. 14, 2016.

(51) Int. Cl.
    *B24B 23/04*     (2006.01)
    *B27B 19/00*     (2006.01)
    *H02K 7/075*     (2006.01)
    *H02K 7/14*     (2006.01)
    *H02K 15/16*     (2006.01)

(52) U.S. Cl.
    CPC .............. *H02K 7/075* (2013.01); *H02K 7/145* (2013.01); *H02K 15/165* (2013.01)

(56) References Cited

U.S. PATENT DOCUMENTS

| | | | |
|---|---|---|---|
| 8,381,833 B2 * | 2/2013 | Bernardi | B25F 5/006 |
| | | | 173/217 |
| 8,757,285 B2 | 6/2014 | Weber et al. | |
| 8,800,682 B2 | 8/2014 | Walker | |
| 8,881,409 B2 * | 11/2014 | Haman | B27B 19/006 |
| | | | 173/217 |
| 10,112,294 B2 | 10/2018 | Fuchs | |
| 10,144,110 B2 | 12/2018 | Furusawa et al. | |
| 2004/0012271 A1 | 1/2004 | Du | |
| 2006/0033401 A1 * | 2/2006 | Huehsam | H02K 7/003 |
| | | | 310/261.1 |
| 2008/0191646 A1 | 6/2008 | Park | |
| 2009/0051238 A1 | 2/2009 | Umehara et al. | |
| 2009/0230796 A1 | 9/2009 | Zhao et al. | |
| 2011/0067894 A1 | 3/2011 | Bernardi | |
| 2013/0042655 A1 * | 2/2013 | Matsuo | D06F 37/304 |
| | | | 310/43 |
| 2013/0213684 A1 | 6/2013 | Ikuta | |
| 2014/0020918 A1 * | 1/2014 | Klabunde | B24B 47/16 |
| | | | 173/217 |
| 2014/0068952 A1 * | 3/2014 | Soreo | B23D 51/16 |
| | | | 173/214 |
| 2015/0151422 A1 | 6/2015 | Kuehne et al. | |
| 2015/0328759 A1 * | 11/2015 | Ikuta | B25D 11/04 |
| | | | 173/179 |
| 2016/0290453 A1 | 10/2016 | Rubens et al. | |

FOREIGN PATENT DOCUMENTS

| | | |
|---|---|---|
| JP | S 60-216751 A | 10/1985 |
| JP | 2008-038893 A | 2/2008 |

OTHER PUBLICATIONS

International Search Report and Written Opinion for corresponding International Application No. PCT/EP2016/063597, pp. 1-24 (dated Aug. 26, 2016).

German Search Report for corresponding German Application No. DE 10 2015 110 266.8, pp. 1-9 (dated Dec. 23, 2015).

International Preliminary Report on Patentability from corresponding International Application No. PCT/EP2016/063597, pp. 1-8 (dated Jan. 4, 2018).

David Strong, "How to Adjust the Eccentric Weight on Rotary Electric Vibrators," https://solutionsinmotion.clecelandvibrator.com/how-to-adjust-the-eccentric-weight-on-rotary-electric-vibrators, pp. 1-9 (2015).

* cited by examiner

OSCILLATING ELECTRIC POWER TOOL WITH BALANCED ARMATURE SHAFT

CROSS REFERENCES TO RELATED APPLICATIONS

This application is a divisional of U.S. application Ser. No. 15/848,069 filed Dec. 20, 2017, which is a continuation of international patent application PCT/EP2016/063597, filed on Jun. 14, 2017, which claims priority from German patent application 10 2015 110 266.8, filed on Jun. 25, 2015. The entire contents of these priority applications are incorporated herein by reference.

BACKGROUND OF THE INVENTION

The invention relates to an oscillating electric power tool with an electric motor having an armature shaft with an armature and a fan wheel, comprising an eccentric arranged on the armature shaft at one end of the armature shaft, comprising a first balancing mass for balancing an unbalance of the eccentric being arranged in the proximity of the eccentric, but at an axial distance therefrom, and comprising a second balancing mass for balancing a couple unbalance caused by the axial distance between the eccentric and the first balancing weight.

The invention further relates to a method for balancing an electric motor for an electric power tool comprising an armature shaft with an armature and a fan wheel, and an eccentric arranged on the armature shaft at one end of the armature shaft.

Oscillating power tools have an eccentric coupling drive for converting the rotational motion of the armature shaft of a motor into a drive motion of a tool shaft oscillating about its longitudinal axis. To this end usually an eccentric is provided directly on the armature shaft of the motor. The eccentric acts together with an eccentric lever for effecting a rotary oscillatory movement of the tool spindle.

It will be understood that the armature shaft must be balanced. To this end usually a balancing mass for balancing an unbalance of the eccentric is provided directly adjacent to the eccentric. By the axial displacement between the eccentric and the balancing mass however there results a couple unbalance which additionally must be balanced. To this end a further balancing mass may be provided, or the fan wheel which is also provided on the output side is respectively unbalanced.

A problem with the prior art designs rests in the fact that with an increasing motor power the size of the eccentric and of an eccentric bearing that is possibly arranged thereon, increases. By the longitudinal displacement between the eccentric and the balancing weight and/or the fan the couple unbalance resulting therefrom usually is balanced in that the armature stack of sheets is provided with suitable recesses.

However a balancing becomes increasingly complicated with machines of higher power. A milling off of the armature stack of sheets in many cases is no longer sufficient to reach the necessary balancing.

SUMMARY OF THE INVENTION

In view of this it is a first aspect of the invention to disclose an oscillating electric power tool wherein a balancing of the armature shaft is reached in a simple and reliable way.

According to another aspect there shall be disclosed an oscillating electric power tool with an EC-motor wherein a balancing of the armature shaft is reached in a simple and reliable way.

According to another aspect there shall be disclosed a method for balancing an electric motor for an oscillating power tool.

According to another aspect there shall be disclosed a method for balancing an EC-motor for an oscillating power tool.

According to a first aspect there is disclosed an oscillating electric power tool, comprising:
  an electric motor including an armature shaft;
  an armature and a fan wheel being arranged on said armature shaft, said armature defining a first side of said armature shaft on which said fan wheel is arranged, and a second side opposite to said first side;
  an eccentric received on said first side of said armature shaft;
  a first balancing mass for compensating an unbalance of the eccentric being arranged in proximity to said eccentric at said first side of said armature shaft;
  a second balancing mass for compensating a couple unbalance caused by an axial distance between said eccentric and said first balancing weight, said second balancing mass being arranged at said second side of said armature shaft.

According to another aspect there is disclosed a method for balancing an electric motor for an electric power tool having an armature shaft, an armature, a fan wheel, and an eccentric being arranged on said armature shaft, said method comprising the following steps:
  providing an armature shaft with an eccentric;
  mounting an armature stack of sheets including armature windings on said armature shaft, thereby defining a first side of said armature shaft and a second side of said armature shaft;
  mounting a fan wheel on said armature shaft on said first side of said armature shaft;
  mounting a first balancing mass in proximity to said eccentric on said first side of said armature shaft;
  mounting a second balancing mass on said second side of said armature shaft;
  adjusting said second balancing mass on said armature shaft for compensating a couple unbalance caused by an axial distance between said eccentric and said first balancing mass;
  clamping said armature shaft on a balancing machine;
  driving said armature shaft on said balancing machine;
  generating signals for specifying size and position of notch(es) to be made on said armature shaft for balancing said armature shaft statically and dynamically;
  providing notches on said armature according to said signals.

According to another aspect there is disclosed a method for balancing an EC-motor for an electric power tool having an armature shaft, an armature, a fan wheel, and an eccentric being arranged on said armature shaft, said method comprising the following steps:
  providing an armature shaft with an eccentric;
  mounting an armature stack of sheets including armature windings on said armature shaft, thereby defining a first side of said armature shaft and a second side of said armature shaft;
  mounting a balancing ring on said armature shaft on said first side adjacent to said armature stack of sheets;

mounting a balancing ring on said armature shaft on said second side adjacent to said armature stack of sheets;

mounting a fan wheel on said armature shaft on said first side of said armature shaft;

mounting a first balancing mass in proximity to said eccentric on said first side of said armature shaft;

mounting a second balancing mass on said second side of said armature shaft;

adjusting said second balancing mass on said armature shaft for compensating a couple unbalance caused by an axial distance between said eccentric and said first balancing mass;

clamping said armature shaft on a balancing machine;

driving said armature shaft on said balancing machine for balancing;

generating signals for specifying size and position of notches to be made on said balancing rings for balancing said armature shaft statically and dynamically;

providing notch(es) on said armature rings according to said signals.

Since according to the invention the second balancing mass is arranged at a side of the armature shaft facing away from the eccentric, a large distance between the eccentric or respectively, the first balancing mass, and the second balancing mass results. Due to the large lever generated thereby only a relatively small second balancing mass is necessary for balancing the couple unbalance. Thus also with high drive power a simple and reliable balancing of the armature shaft including an eccentric and possibly eccentric bearing is ensured.

According to a further development of the invention there is received an eccentric bearing on the eccentric, wherein the first balancing mass is configured for compensating the unbalance of the eccentric and the eccentric bearing, and wherein the second balancing mass is configured for balancing the remaining couple unbalance.

Also with such a design a balancing of the couple unbalance can be ensured in this way.

According to a further development of the invention the first balancing mass is configured as a first balancing disk that is arranged on the armature shaft adjacent the eccentric.

In this way a very simple design results, and, due to the direct arrangement of the first balancing disk adjacent to the eccentric, the resulting couple unbalance is kept as small as possible.

According to a further development of the invention the second balancing mass is configured as a second balancing disk that is arranged on the armature shaft.

In this way a simple arrangement of the second balancing mass on the armature shaft is made possible.

In a further preferred configuration of the invention the second balancing mass is made of an electrically non-conducting material, preferably from plastic.

This embodiment has the advantage that due to the insulating material the electric safety is not impeded, even if the second balancing mass is arranged directly adjacent to a commutator in case of a commutator motor.

According to the method according to the invention preferably there is mounted an eccentric bearing on the eccentric, before performing the balancing operation on the balancing machine.

In this way in case of a configuration as an eccentric coupling drive with an eccentric bearing on the eccentric a balancing of the unbalance resulting from the eccentric bearing is ensured.

According to a further development of the invention on the armature shaft two armature bearings are mounted before performing the balancing operation on the balancing machine.

According to this configuration possible unbalances resulting from the armature bearings are also balanced.

In a further development of the method according to the invention a first balancing mass configured as a balancing disk is utilized that preferably is arranged adjacent the eccentric.

In this way a simple design and a couple unbalance as small as possible are ensured.

As already mentioned above, the second balancing mass preferably is configured as a balancing disk consisting of an electrically non-conducting material, preferably from a plastic material.

It will be understood that the features of the invention mentioned above and to be explained hereinafter cannot only be used in the given combination, but also in different combinations or independently without departing from the scope of the invention.

BRIEF DESCRIPTION OF THE DRAWINGS

Further features and advantages of the invention can be taken from the subsequent description of a preferred embodiment with reference to the drawings. In the drawings show.

DESCRIPTION OF PREFERRED EMBODIMENTS

Figure 1:
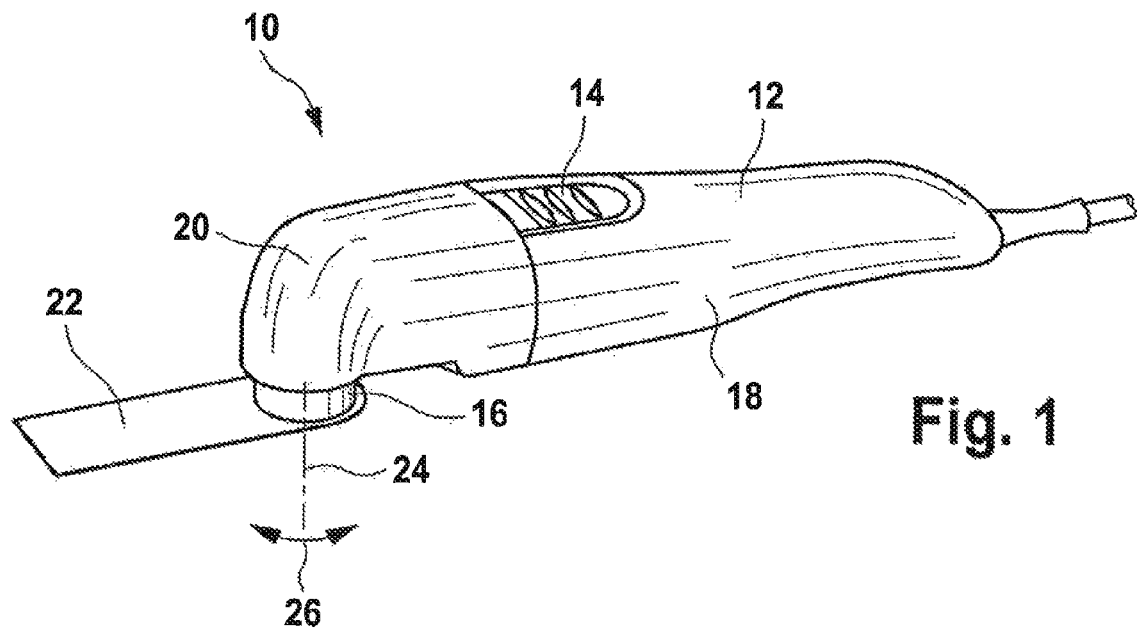
FIG. 1 a perspective representation of a power tool including a drive according to the invention.

In FIG. 1 a power tool according to the invention is shown in perspective representation and is denoted in total with numeral 10.

The power tool 10 comprises a longitudinal housing 12 which can be gripped around with one hand, and at the top side of which a switch 14 for switching on and off the power tool 10 is arranged. In the rear part of the housing there is received an electric motor which is only designated with numeral 18. In the front part of the housing there is indicated an eccentric coupling drive with numeral 20 which converts a rotary drive motion of the electric motor 18 into a rotary oscillatory drive motion of a tool spindle 16 that protrudes from the end of the housing 12 to the outside at an angle. The eccentric coupling drive 20 is configured so that the tool spindle 16 oscillates back and forth about a longitudinal axis 24 of the tool spindle 16 at high frequency, usually in the range from 5,000 to 25,000 oscillations per minute, and at a small pivot angle, usually in the range from 0.5 to 3 degrees, such as indicated by the double arrow 26.

At the end of the tool spindle 16 a tool 22 can be secured exchangeably, as depicted here exemplarily by a sawing tool 22.

Figure 2:
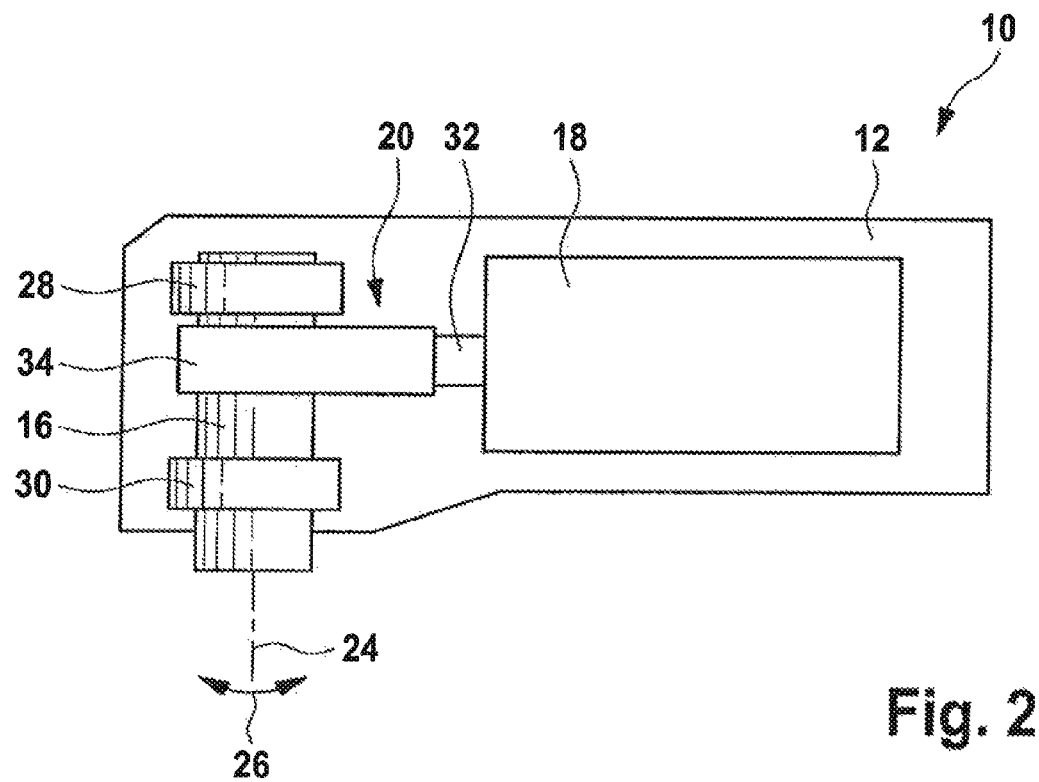
FIG. 2 a simplified schematic representation of the power tool according to FIG. 1 including the tool spindle, the electric motor and the oscillatory drive.

In FIG. 2 the power tool 10 is shown in a simplified schematic representation. The electric motor 18 drives the tool spindle 16 rotatingly oscillatingly about the longitudinal axis 24 via the eccentric coupling drive 20. The tool spindle 16 is mounted by means of two bearings 28, 30 within the housing 12. The eccentric coupling drive 20 comprises an eccentric 32 which is formed directly on the electric motor 18 as will be described hereinafter in more detail. The eccentric 32 cooperates with an eccentric lever 34 by means of which the rotary drive motion of the electric motor 18 is converted into the oscillatory motion of the tool spindle 16.

Figure 3:
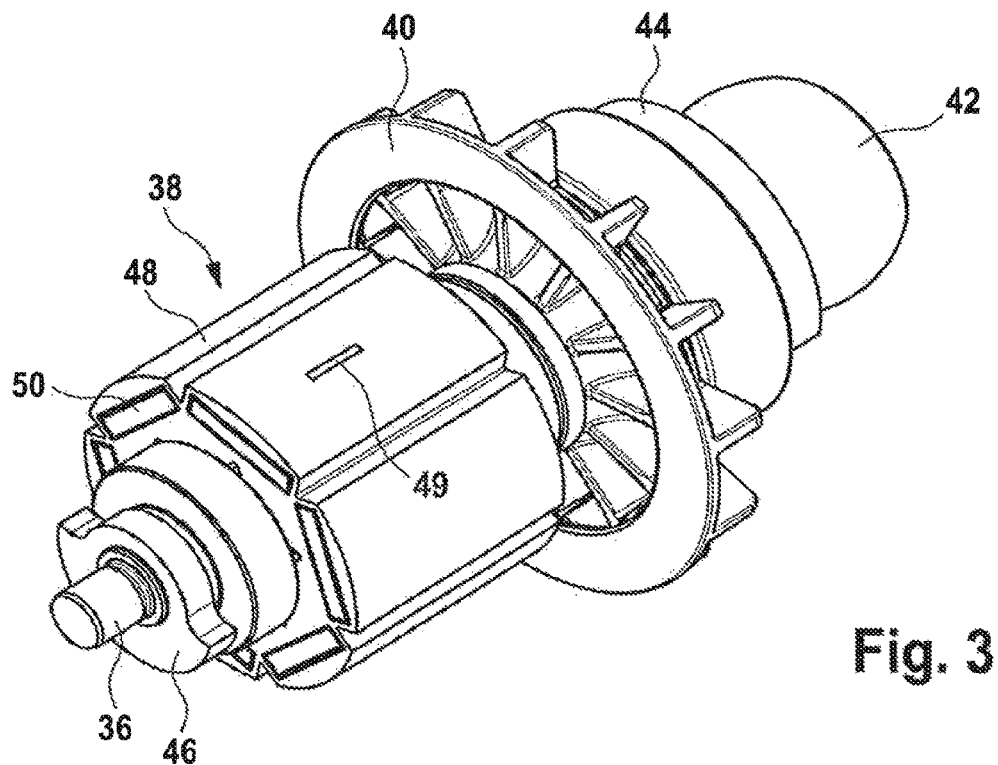
FIG. 3 an enlarged perspective representation of the armature shaft of the motor including the armature mounted thereon and the fan wheel, two balancing weights and an eccentric bearing.
Figure 4:
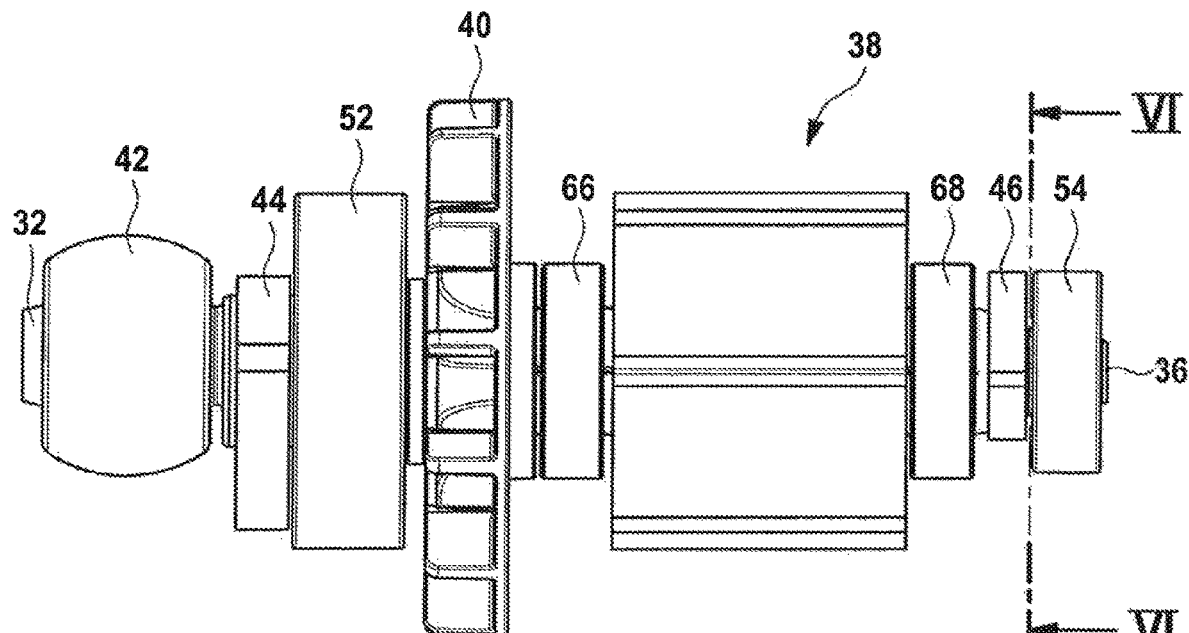
FIG. 4 a side elevation of the completed armature shaft according to FIG. 3, wherein in addition there is depicted an armature bearing at the end opposite to the eccentric bearing.

As can be seen from FIGS. 3 and 4 the electric motor 18 comprises an armature shaft 36 at one end of which facing away from the drive the eccentric 32 is formed integrally with the armature shaft 36. On the eccentric 32 there is held an eccentric bearing 42 having a crowned outer ring and that is enclosed by a fork-shaped end of the eccentric lever 34. Directly adjacent to the eccentric bearing 42 or the eccentric 32, respectively, there is arranged on the armature shaft 36 a first balancing mass configured as a first balancing disk 44. The first balancing mass 44 serves for balancing the unbalance caused by the eccentric 32 and the eccentric bearing 42.

Since the first balancing mass 44 is arranged on the armature shaft 36 axially displaced with respect to the unbalance caused by the eccentric 32 and the eccentric bearing 42, there results a couple unbalance which must be additionally balanced.

According to the invention to this end a second balancing weight configured as a second balancing disk 46 is provided which is arranged in the region of the opposite end of the armature shaft 36. Adjacent to the first balancing mass 44 there is arranged a first bearing 52 on the armature shaft 36. At the opposite end of the armature shaft 36 there is arranged a second bearing 54. Adjacent to the first bearing 52 a fan wheel 40 is provided on the armature shaft 36.

Between the second bearing 54 at the end of the armature shaft 36 and the second balancing mass 46 there is arranged adjacent thereto the armature 38 with its armature stack of sheets 48 (see FIG. 3) and armature windings 50 received thereon. At the armature stack of sheets 48 in addition there may be provided balancing recesses 49, such as shown exemplarily in FIG. 3.

Optionally in addition adjacent to the armature stack of sheets 48 there may be provided balancing rings 66, 68 such as shown in FIG. 4. The utilization of balancing rings 66, 68 is useful in case the electric motor 12 is configured as an EC-motor. Namely, in this case the balancing cannot be done directly on the armature stack of sheets 48, since in this case permanent magnets instead of windings would be received at 50. In this case then the balancing is done at the balancing rings 66, 68.

Figure 5:
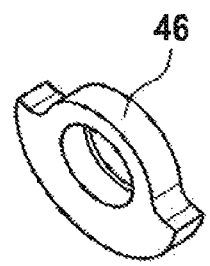
FIG. 5 a perspective representation on the second balancing mass according to FIG. 3.

The second balancing mass 46 configured as the balancing disk is shown again in FIG. 5 in enlarged representation.

Figure 6:
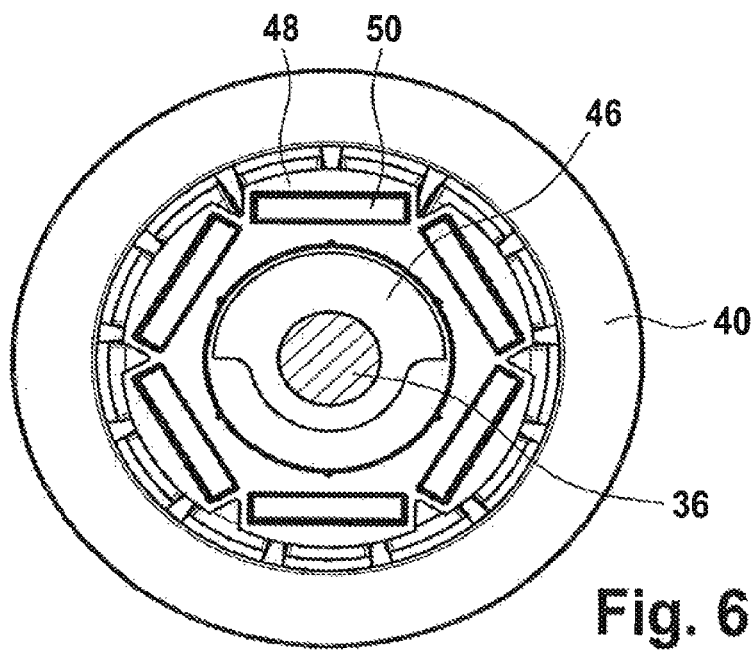
FIG. 6 a sectional representation along the line VI/VI according to FIG. 4.
Figure 7:
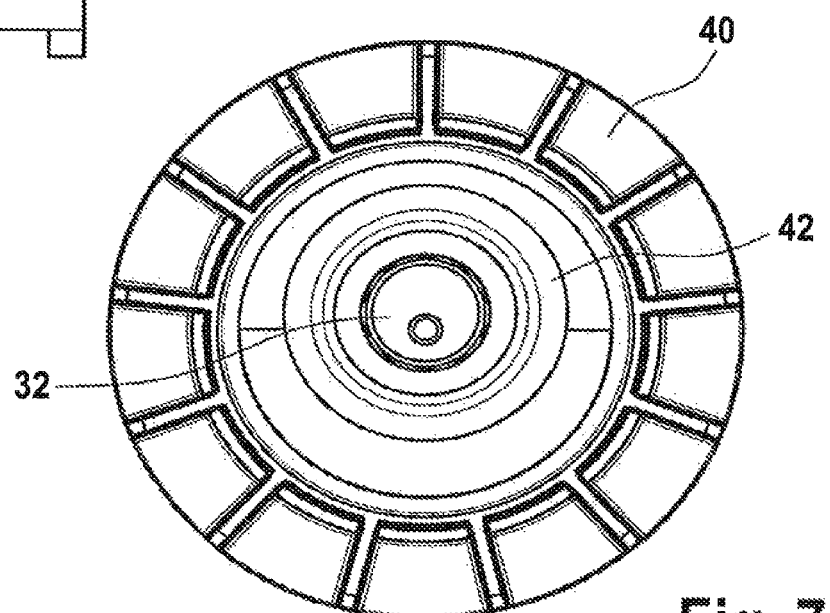
FIG. 7 a representation of the completed armature according to FIG. 3, seen from the eccentric side.

FIGS. 6 and 7 show a sectional representation through the armature according to FIG. 4 along the line VI-VI and, an end view of the armature shaft 36 seen from the eccentric 32, respectively.

The second balancing disk 46 serves for balancing the couple unbalance that is due to the axial displacement between the eccentric 32 and the eccentric bearing 42 as well as the first balancing mass 44.

Since the second balancing mass 46 is arranged at a large axial distance from the eccentric 32, the eccentric bearing 42 and the first balancing mass 44, only a relatively small mass is sufficient for compensating the couple unbalance.

Preferably, the second balancing mass 46 is made of an electrically insulating material configured as a plastic material.

This has the advantage that the electric safety is by no means impaired thereby. In the present case the electric motor 18 is configured as an EC-motor so that it does not have a commutator.

However, in case of a common universal motor comprising a commutator the second balancing mass is placed in direct vicinity of the commutator. Also in this case the configuration of the second balancing mass made of plastic is particularly advantageous, since in this way the electric safety also in the case of commutator sparking is by no means impaired.

To ensure a balanced running of the armature shaft 36 the fully completed armature shaft is clamped according to FIGS. 3 and 4, respectively, on a balancing machine and is dynamically balanced.

Figure 8:
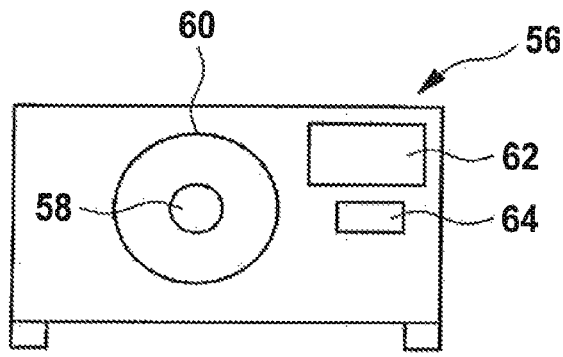
FIG. 8 a simplified schematic representation of a balancing machine for balancing the completed armature shaft.

Such a balancing machine 56 is shown schematically in FIG. 8. The balancing machine 56 comprises a receptacle 58 for clamping the armature shaft 36, as well as a protecting sheet 60 which due to safety reasons during the balancing operation can be shifted above the armature shaft 36. By means of an electronic control 64 the balancing machine 56 is controlled. The specific position and magnitude of a determined unbalance is shown on a display 62 so that it can be directly seen at which place of the armature stack of sheets 48 a milling or balancing recess must be generated and at what size.

Such a milling out 49 which can be obtained by means of an assigned milling unit (not shown here) is shown exemplarily in FIG. 3.

In this way a statically and dynamically balanced running of the armature shaft 36 is ensured.

What is claimed is:

1. A method for balancing an electric motor for an electric power tool having an armature shaft, an armature, a fan wheel, and an eccentric being arranged on the armature shaft, the method comprising:

providing an armature shaft with an eccentric;

mounting an armature stack of sheets including armature windings on said armature shaft, thereby defining a first side of said armature shaft and a second side of said armature shaft;

mounting a fan wheel on said armature shaft on said first side of said armature shaft;

mounting a first balancing mass in proximity to said eccentric on said first side of said armature shaft;

mounting a second balancing mass on said second side of said armature shaft; adjusting said second balancing mass on said armature shaft for compensating a couple unbalance caused by an axial distance between said eccentric and said first balancing mass;

clamping said armature shaft on a balancing machine; driving said armature shaft on said balancing machine;

generating signals for specifying size and position of notch(es) to be made on said armature shaft for balancing said armature shaft statically and dynamically; and providing notch(es) on said armature according to said signals.

2. The method of claim 1, further comprising the step of mounting an eccentric bearing on said eccentric, before said balancing step on said balancing machine is performed.

3. The method of claim 1, further comprising the step of mounting an armature bearing on said first side and mounting an armature bearing on said second side of said armature shaft before said balancing step on said balancing machine is performed.

4. The method of claim 1, wherein a balancing disk is utilized as said first balancing mass.

5. The method of claim 1, wherein said first balancing mass is mounted on said armature shaft adjacent to said eccentric.

6. The method claim 1, wherein said second balancing mass is configured as a balancing disk made of an electrically non-conducting material.

7. The method claim 1, wherein said second balancing mass is configured as a balancing disk made of an electrically non-conducting plastic material.

8. A method for balancing an EC-motor for an electric power tool having an armature shaft, an armature, a fan wheel, and an eccentric being arranged on said armature shaft, the method comprising:

provuding an armature shaft with an eccentric;

mounting an armature stack of sheets including armature windings on said armature shaft, thereby defining a first side of said armature shaft and a second side of said armature shaft;

mounting a balancing ring on said armature shaft on said first side adjacent to said armature stack of sheets;

mounting a balancing ring on said armature shaft on said second side adjacent to said armature stack of sheets;

mounting a fan wheel on said armature shaft on said first side of said armature shaft;

mounting a first balancing mass in proximity to said eccentric on said first side of said armature shaft;

mounting a second balancing mass on said second side of said armature shaft;

adjusting said second balancing mass on said armature shaft for compensating a couple unbalance caused by an axial distance between said eccentric and said first balancing mass;

clamping said armature shaft on a balancing machine;

driving said armature shaft on said balancing machine for balancing;

generating signals for specifying size and position of notches to be made on said balancing rings for balancing said armature shaft statically and dynamically; and providing notches on said balancing rings according to said signals.

9. The method claim 8, wherein said second balancing mass is configured as a balancing disk made of an electrically non-conducting plastic material.

* * * * *